(12) United States Patent
Hatanaka et al.

(10) Patent No.: US 7,968,221 B2
(45) Date of Patent: Jun. 28, 2011

(54) LITHIUM ION SECONDARY BATTERY

(75) Inventors: Tsuyoshi Hatanaka, Wakayama (JP); Tatsuya Hashimoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/158,211

(22) PCT Filed: Dec. 19, 2006

(86) PCT No.: PCT/JP2006/325303
§ 371 (c)(1), (2), (4) Date: Jun. 19, 2008

(87) PCT Pub. No.: WO2007/072833
PCT Pub. Date: Jun. 28, 2007

(65) Prior Publication Data
US 2009/0176147 A1    Jul. 9, 2009

(30) Foreign Application Priority Data
Dec. 19, 2005    (JP) .................................. 2005-364600

(51) Int. Cl.
| H01M 4/64 | (2006.01) |
| H01M 4/70 | (2006.01) |
| H01M 10/05 | (2010.01) |
| H01M 10/0525 | (2010.01) |
| H01M 10/0585 | (2010.01) |
| H01M 10/058 | (2010.01) |

(52) U.S. Cl. .......................... 429/94; 429/161; 429/211
(58) Field of Classification Search .................. 429/94, 429/142, 161, 211
See application file for complete search history.

(56) References Cited

U.S. PATENT DOCUMENTS

| 6,627,346 B1 * | 9/2003 | Kinouchi et al. ............. 429/144 |
| 2002/0061443 A1 * | 5/2002 | Nakanishi et al. ............ 429/223 |
| 2004/0131934 A1 * | 7/2004 | Sugnaux et al. .............. 429/209 |
| 2005/0202319 A1 * | 9/2005 | Kim ............................ 429/233 |

FOREIGN PATENT DOCUMENTS

| JP | 10-233339 | 9/1998 |
| JP | 10-334950 | 12/1998 |
| JP | 3082766 | 6/2000 |
| JP | 2000208123 A * | 7/2000 |
| JP | 2001-110408 | 4/2001 |
| JP | 2001-210330 | 8/2001 |
| JP | 2003-51340 | 2/2003 |
| JP | 2003036889 A * | 2/2003 |
| JP | 2003-203632 | 7/2003 |
| JP | 2003-243038 | 8/2003 |
| JP | 2004-349156 | 12/2004 |
| JP | 2005-085674 | 3/2005 |
| JP | 2005-317309 | 11/2005 |
| WO | WO 2004059758 A2 * | 7/2004 |

* cited by examiner

*Primary Examiner* — Gregg Cantelmo
(74) *Attorney, Agent, or Firm* — McDermott Will & Emery LLP

(57) ABSTRACT

A lithium ion secondary battery which includes: a negative electrode plate 406 in which a negative electrode mixture layer 404 is formed on each of both surfaces of a negative electrode current collector 401 containing copper as a principle component and having a sheet shape; a positive electrode plate 407 in which a positive electrode mixture layer 405 is formed on each of both surfaces of a positive electrode current collector 402 containing aluminum as a principle component and having a sheet shape; and a separator 403 holding an electrolyte. The negative electrode plate 406, the positive electrode plate 407 and the separator 403 are spirally wound or stacked. The thickness of the positive electrode current collector 402 is smaller than the thickness of the negative electrode current collector 401.

3 Claims, 4 Drawing Sheets

LITHIUM ION SECONDARY BATTERY

RELATED APPLICATIONS

This application is the U.S. National Phase under 35 U.S.C. §371 of International Application No. PCT/JP2006/325303, filed on Dec. 19, 2006, which in turn claims the benefit of Japanese Application No. 2005-364600, filed on Dec. 19, 2005, the disclosures of which Applications are incorporated by reference herein.

TECHNICAL FIELD

The present invention relates to a lithium ion secondary battery for high power application, such as a battery for a hybrid electric vehicle (HEV), and more particularly relates to an electrode plate group structure which improves the safety of a battery when an internal short-circuit occurs in the battery.

BACKGROUND ART

Lithium ion secondary batteries, which are storage battery with high energy density, are used as major power sources of various portable devices. In recent years, electrode structures or current collectors have been devised to increase the power of lithium ion secondary batteries. Lithium ion secondary batteries are expected to be developed as power sources for hybrid electric vehicles (HEV) by utilizing its compact and light weight features. Such a lithium ion secondary battery includes an electrode group in which strip shaped positive and negative electrode plates, each including a mixture layer and a current collector, and a separator providing electrical insulation between the electrode plates and holding an electrolyte therein are spirally wound. As the separator, a microporous thin sheet mainly containing polyethylene having a thickness of several tens μm is used.

To increase the power of a lithium ion secondary battery, it is necessary to reduce a member resistance and a reaction resistance. To reduce a member resistance and a reaction resistance, for example, besides forming leads with a large thickness and optimizing welding conditions, the following method can be used. After providing an exposed portion in which the mixture layer does not exist is provided at one end of the current collector along a long side direction in each of the electrode plates, the electrode plates are arranged so that an exposed portion of the positive electrode current collector is located at one end of the electrode group and an exposed portion of the negative electrode current collector is located at the other end of the electrode group. Then, the exposed portions of the current collectors are assembled and welded to ensure uniform channels for electrons in the strip shaped electrodes.

To reduce a reaction resistance, besides increasing the ratio of the area of an active material with respect to the area of the mixture layer and optimizing the amount of a conductive material, a method can be used in which the area of the positive and negative electrode plates is increased to reduce a current density, thereby suppressing a voltage drop when a discharge reaction occurs. In fact, an electrode plate of a lithium ion secondary battery for high power application, which is currently under development, is formed to have an area substantially equal to or larger than the double of the area of an electrode plate of a lithium ion secondary battery for various portable devices when the two electrode plates are compared in the same capacity.

When an internal short-circuit occurs in a lithium ion secondary battery developed specifically for high power application, its high power property is increased and a short-circuit current is accordingly increased. Specifically, in a lithium ion secondary battery for high power application, a reaction resistance Rr is reduced for the purpose of achieving high power output. Thus, the reaction resistance Rr provided for rate-determining of a short-circuit current I is small and a short-circuit current (I=V/Rr where V is a standardized voltage) is large. As described above, in a lithium ion secondary battery for high power application, a short-circuit current which flows in the battery when an internal short-circuit occurs is relatively large. Accordingly, the temperature inside of the lithium ion secondary battery is rapidly increased due to Joule heat and there is a possibility that fume emission occurs in the battery.

In general, to ensure the safety of a lithium ion secondary battery, a test in which an electrically abnormal state such as an overcharge, an overdischarge and the like is simulated and a test in which an external physical impact such as sticking of a nail therein or crush by application of pressure is simulated are conducted. Moreover, a safety mechanism for preventing explosion, combustion and fume emission of the battery is adopted.

Specifically, for example, in a HEV pack battery in which several tens cells of lithium ion secondary batteries are connected in series, a safety mechanism in which a charge/discharge current is forcedly stopped by a battery control system is established for an electrically abnormal state such as an overcharge, an overdischarge and the like. Since the battery control system can not cover a damage caused by an external physical impact such as sticking of a nail therein and the like, a safety mechanism such as a mechanism for accommodating the pack battery in a strong exterior case which can withstand an external physical impact and the like has to be established for an external physical impact.

For example, Patent Reference 1 discloses that when a high capacity, high power and long life lithium ion secondary battery in which a defective such as a short-circuit and the like does not occur between positive and negative electrodes even after a lapse of time can be achieved by using a negative electrode current collector of which, when a negative electrode plate is pressed so that a bulk density of a negative electrode mixture is set to be a predetermined level, an area increase rate per unit area becomes 0.5% or more and 2% or less. Patent Reference 1 further discloses that to obtain such high capacity, high power and long life lithium ion secondary battery, a copper foil having a thickness of 9 μm or more and a surface roughness (Ra) of 0.10 or more is preferably used as the negative electrode current collector.

Patent Reference 1: Japanese laid-Open Publication No. 2001-210330

DISCLOSURE OF THE INVENTION

Problems that the Invention is to Solve

However, according to a known technique, the safety of a lithium ion secondary battery (which will be hereafter referred to as merely "battery") against an internal physical impact can not be ensured. That is, due to an internal physical impact, an internal short-circuit might occur in the battery and fume emission of the battery might be caused.

Moreover, to ensure the safety of the battery against an external physical impact, a strong exterior case has to be used as an exterior case in which a pack battery is accommodated. In addition, assuming that when an external or internal physical impact is applied to a battery, fume emission of the battery occurs, a fume control structure which prevents inflow of gas into a compartment of a vehicle has to be adopted to a pack battery. Accordingly, the lithium ion secondary battery can no longer exhibit its compact and light weight features. As the size of the pack battery is increased, it becomes difficult to load the battery into a vehicle.

Specifically, a short-circuit due to an external physical impact such as sticking of a nail occurs only in a small area. In such case, it is highly possible that a short-circuit current concentrates in a short-circuited part and fume emission of the battery occurs. Therefore, assuming a case where fume emission of the battery occurs, the fume control structure has to be provided in the pack battery.

The present invention has been devised to solve the above-described problems and it is therefore an object of the present invention to ensure the safety of a battery by itself against an internal or external physical impact without sacrificing its basic performances, i.e., a long life of 10 or more years and high power property, required for a high power application battery. Specifically, it is an object of the present invention to develop a battery with high safety, in which fume emission is not caused even when a nail is stuck in the battery.

Solution to the Problems

To achieve the above-described object, a lithium ion secondary battery according to the present invention is a lithium ion secondary battery including; a negative electrode plate in which a negative electrode mixture layer is formed on each of both surfaces of a negative electrode current collector containing copper as a principle component and having a sheet shape; a positive electrode plate in which a positive electrode mixture layer is formed on each of both surfaces of a positive electrode current collector containing aluminum as a principle component and having a sheet shape; and a separator holding an electrolyte, the negative electrode plate, the positive electrode plate and the separator being spirally wound or stacked, and is characterized in that a thickness of the positive electrode current collector is smaller than a thickness of the negative electrode current collector, and the lithium ion secondary battery has a weight power density of 1700 W/kg or more.

The lithium ion secondary battery of the present invention is designed so that the thickness of the positive electrode current collector is smaller than the thickness of the negative electrode current collector. Thus, even if an internal short-circuit occurs in the battery due to an internal or external physical impact, by utilizing Joule heat, the temperature of the positive electrode current collector (aluminum core material) can be increased to the fusing temperature of aluminum to fuse and cut a short-circuited part in the positive electrode current collector at a moment before the temperature of the negative electrode current collector (copper core material) reaches a reaction start temperature of a reaction between the negative electrode mixture layer and the electrolyte. Accordingly, before reaction heat is generated by an exothermic reaction between the negative electrode mixture layer and the electrolyte, a short-circuit current can be reduced by increase in short-circuit resistance to reduce Joule heat, thus suppressing increase in temperature of the entire battery. Therefore, the occurrence of fume emission of the battery can be prevented and thus the safety of the battery can be improved.

As described above, for the lithium ion secondary battery of the present invention, the safety of the battery against an internal or external physical impact can be ensured by the battery itself. Therefore, features of the lithium ion secondary battery, such as compact and lightweight features, can be fully utilized and mountability of the lithium ion secondary battery in a vehicle can be improved.

In the lithium ion secondary battery of the present invention, it is preferable that the thickness Da of the positive electrode current collector and the thickness Dc of the negative electrode current collector satisfy the relationship of $1.2 \leq Dc/Da \leq 2$.

In the lithium ion secondary battery of the present invention, it is preferable that the lithium ion secondary battery has a weight power density of 1700 W/kg or more.

Thus, in the battery having a weight power density of 1700 W/kg or more, i.e., a lithium ion secondary battery for high power application, a short-circuit current flowing therein at a time of the occurrence of an internal short-circuit is relatively large and the temperature of the positive electrode current collector (aluminum core material) can be effectively increased by relatively large Joule heat. Therefore, the positive electrode current collector can be fused and cut at a moment after the occurrence of the internal short-circuit.

In the lithium ion secondary battery of the present invention, it is preferable that the thickness of the positive electrode current collector is 8 μm or more and 30 μm or less.

Thus, by adjusting the thickness of the positive electrode current collector to be 30 μm, the positive electrode current collector can be fused and cut at a moment after the occurrence of an internal short-circuit.

It is preferable that the lithium ion secondary battery of the present invention further includes at least a single porous heat-resistant layer between the positive electrode plate and the negative electrode plate.

Thus, even if a burr is generated due to an external physical impact such as sticking of a nail at a part of each electrode plate to which the impact is applied, the porous heat-resistant layer can prevent direct contact of the positive electrode plate and the negative electrode plate. Therefore, the safety of the battery can be further improved.

In the lithium ion secondary battery, it is preferable that the porous heat-resistant layer includes an inorganic oxide filler.

Effects of the Invention

According to the present invention, even if a battery is destroyed by an internal or external physical impact, it is possible to prevent the occurrence of fume emission of the battery and also long life and high power properties of the battery can be maintained. Therefore, a lithium ion secondary battery for high power application with excellent safety can be provided.

EXPLANATION OF REFERENCE NUMERALS

| | |
|---|---|
| 103 | Separator |
| 106 | Negative electrode plate |
| 107 | Positive electrode plate |
| 108 | Lead |
| 109 | Lead |
| 110 | Negative electrode |
| 111 | Positive electrode |
| 112 | Battery case |
| N | Nail |
| 201 | Negative electrode current collector |
| 202 | Positive electrode current collector |
| 203 | Separator |
| 204 | Negative electrode mixture layer |
| 205 | Positive electrode mixture layer |
| Ac | Cross section area of copper core material |
| Aa | Cross section area of aluminum core material |
| $\Delta Lc, \Delta La$ | Length |
| P1, P2, P3 | Segment |
| 301 | Negative electrode current collector |
| 302 | Positive electrode current collector |
| 304 | Negative electrode mixture layer |
| 305 | Positive electrode mixture layer |
| 306 | Negative electrode plate |
| 307 | Positive electrode plate |
| 301c | Exposed portion of negative electrode current collector |
| 301a | Exposed portion of positive electrode current collector |
| 401 | Negative electrode current collector |
| 402 | Positive electrode current collector |
| 403 | Separator |
| 404 | Negative electrode mixture layer |
| 405 | Positive electrode mixture layer |
| 406 | Negative electrode plate |
| 407 | Positive electrode plate |

BEST MODE FOR CARRYING OUT THE INVENTION

The present invention will be hereafter described with reference to the accompanying drawings. Note that in the following description, states of each battery when a nail sticking test was performed to batteries will be described as specific examples. The nail sticking test herein is a test to simulate situations where a battery is destroyed by an external physical impact from the outside of the battery.

Figure 1:
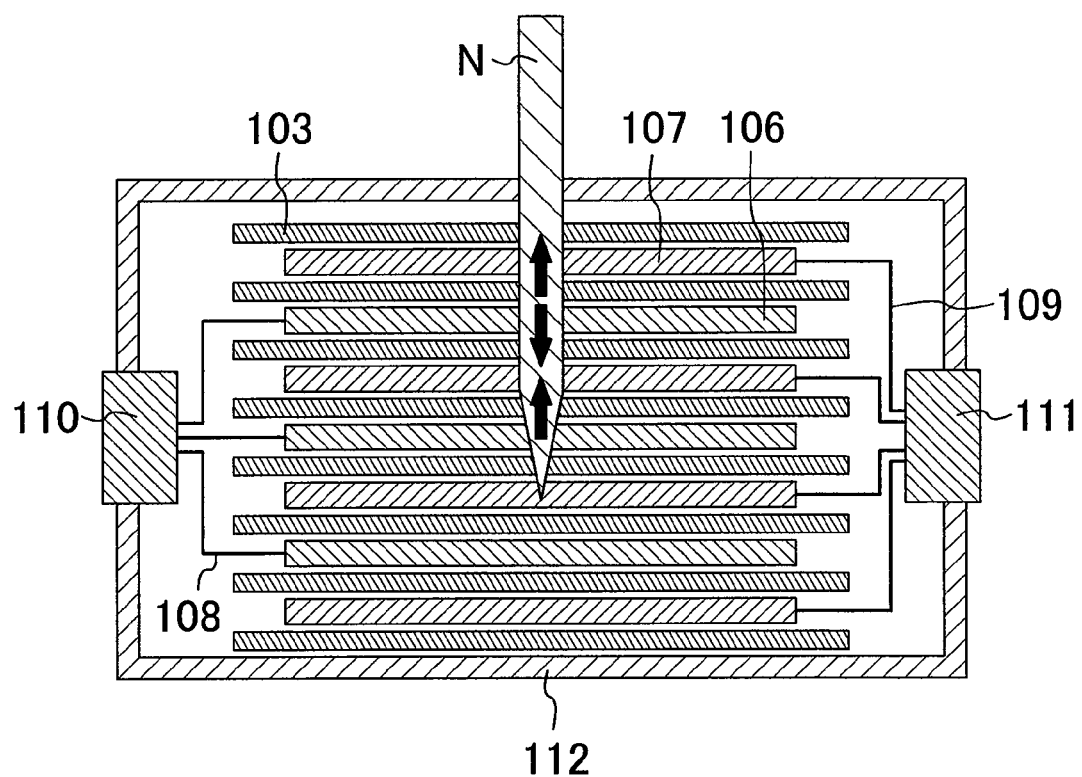
FIG. 1 is a cross-sectional view illustrating a state of a battery when a nail is stuck therein.

Inner states of a battery when a nail is stuck in the battery will be described with reference to FIG. 1. FIG. 1 is a cross-sectional view illustrating a state of a battery when a nail is stuck therein. As shown in FIG. 1, a lithium ion secondary battery electrode plate group in which a negative electrode plate 106, a positive electrode plate 107 and a separator 103 for holding an electrolyte are spirally wound is accommodated in a battery case 112. The negative electrode plate 106 is electrically connected to the negative electrode 110 via leads 108 each of which is connected to the negative electrode plate 106. On the other hand, the positive electrode plate 107 is electrically connected to the positive electrode 111 via leads 109 each of which is connected to the positive electrode plate 107. When a nail N is stuck in the battery of FIG. 1 and the battery is short-circuited, a current flows via the nail N. Herein, each arrow in FIG. 1 shows a flow of a current. The positive electrode plate 107 includes a positive electrode current collector and a positive electrode mixture layer formed on each of both surfaces thereof and the negative electrode plate 106 includes a negative electrode current collector and a negative electrode mixture layer formed on each of both surfaces thereof.

First, at a time when the battery is short-circuited, it is likely that a short-circuit current flows mainly in the nail N with a low resistance and positive and negative electrode current collectors. In such case, the temperature of the nail N in which a short-circuit current flows and the temperatures of parts of the positive and negative electrode current collectors located around the nail N are increased due to Joule heat.

Thereafter, with continuous flow of a short-circuit current, the temperatures of the negative electrode current collector (copper core material) and the positive electrode current collector (aluminum core material) are rapidly increased due to Joule heat. In general, the nail N itself has a larger heat capacity than that of the negative and positive electrode current collectors. Therefore, an increase in temperature of the nail N is relatively small. Each of the positive and negative electrode mixture layers has a larger resistance than that of an associated one of the current collectors. Therefore, a short-circuit current flowing therein is small and an increase in temperature of each of the positive and negative electrode mixture layers is relatively small. In contrast, each of the positive and negative electrode current collectors has a smaller cross section area than that of the nail N and an increase in temperature of each of the positive and negative electrode current collectors is relatively large.

A mechanism in which when the nail N is stuck in a battery, fume emission of the battery occurs is as follows. When the temperature of the negative electrode current collector is increased to nearly 250° C. due to Joule heat, a reaction between the negative electrode mixture layer and the electrolyte is started. This reaction is an exothermic reaction and induces a reaction between the negative electrode mixture layer and the electrolyte around a reaction start area. Accordingly, a chain exothermic reaction between the negative electrode mixture layer and the electrolyte occurs, so that the temperature inside of the battery is increased. When the temperature inside of the battery is further increased and the temperature of a positive electrode active material is increased to nearly 410° C., a thermal decomposition reaction of the positive electrode active material is started. This reaction is an exothermic reaction and induces a thermal decomposition reaction of the positive electrode active material around a part of the positive electrode active material located around a thermal decomposition reaction start area. Accordingly, a chain thermal decomposition reaction of the positive electrode active material occurs, so that a large amount of gas is generated. That is, fume emission of the battery occurs.

According to the present invention, utilizing Joule heat generated due to a short-circuit current flowing when an internal short-circuit is generated in the battery, the temperature of the positive electrode current collector is increased to a fusing temperature so that a short-circuited part of the positive electrode current collector is fused and cut in a moment preferably before a chain exothermic reaction between the negative electrode mixture layer and the electrolyte occurs (more preferably, before the temperature of the negative electrode current collector reaches a reaction start temperature of the negative electrode mixture layer and the electrolyte). Thus, before reaction heat due to a chain exothermic reaction between the negative electrode mixture layer and the electrolyte is generated, a short-circuit current can be reduced by increasing a short-circuit resistance, thereby reducing Joule heat. Accordingly, the increase in temperature of the entire battery can be suppressed, thereby preventing the occurrence of fume emission of the battery.

To increase the temperature of the positive electrode current collector to the fusing temperature before the temperature of the negative electrode current collector reaches a reaction start temperature of a reaction between the electrolyte and the negative electrode mixture layer, the thickness Da of the positive electrode current collector and the thickness Dc of the negative electrode current collector have to satisfy the relationship of Da<Dc.

Hereafter, the reason why Da and Dc have to satisfy the relationship of Da<Dc in the lithium ion secondary battery of the present invention will be described with reference to FIGS. 2(a) and 2(b) and FIG. 3. Note that in the following description, the heat radiation process is not taken into consideration for the purpose of simplicity.

Figure 2A:
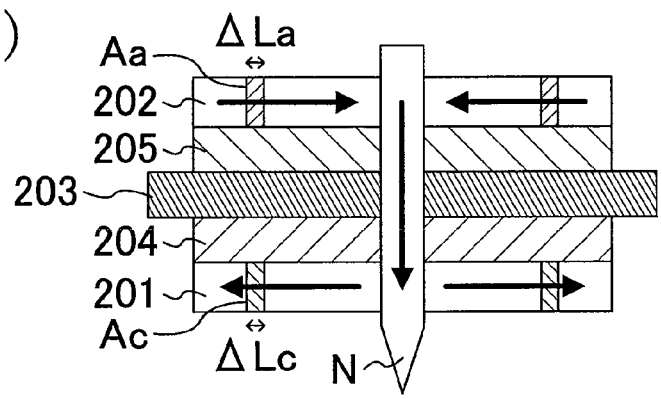
FIGS. 2(a) and 2(b) are enlarged views illustrating a part of a lithium ion secondary battery according to the present invention in which a nail is stuck.
Figure 2B:
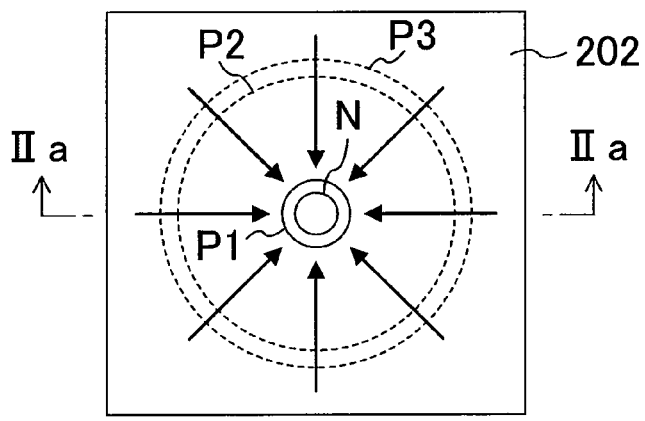

FIGS. 2(a) and 2(b) are enlarged views illustrating a part of the lithium ion secondary battery of the present invention in which a nail is stuck. Specifically, FIG. 2(a) is a cross-sectional view taken along the line IIa-IIa of FIG. 2(b). FIG. 2(b) is a plan view of the nail sticking part when viewed from the positive electrode side. FIG. 3 is a graph showing the relationship between each of respective thicknesses of the aluminum core material and the copper core material and increase in temperature thereof.

As shown in FIGS. 2(a) and 2(b), when a nail is stuck in the battery in which the negative electrode plate including a negative electrode core material (negative electrode current collector) 201 and a negative electrode mixture layer 204 formed on the negative electrode core material 201, the positive electrode plate including a positive electrode core material (positive electrode current collector) 202 and a positive electrode mixture layer 205 formed on the positive electrode core material 202, and a separator 203 are spirally wound, a short-circuit current flows from the positive electrode core material (aluminum core material) 202 to the negative electrode core material (copper core material) 201 via the nail N.

A short-circuit current I flowing in the lithium ion secondary battery of the present invention when an internal short-circuit occurs can be expressed by I=V/R where V is a voltage of the lithium ion secondary battery and R is a resistance thereof. In this case, components of the resistance R include a reaction resistance, a positive electrode core material resistance, a negative electrode core material resistance, a resistance of the positive electrode mixture layer, a resistance of the negative electrode mixture layer and a resistance of the nail. Of the resistances, the reaction resistance is the largest resistance. Note that a transfer resistance of lithium ions in the electrolyte is possibly a component of the resistance R, but since a very short time (for example, several m seconds) in a moment when the nail is stuck is assumed in the following description, the ion transfer resistance is ignorable.

Then, assume that the reaction resistance is Rr. The current flowing when a short-circuit occurs can be approximated using Formula 1.

$$I = V/Rr \quad \text{[Formula 1]}$$

As shown in FIGS. 2(a) and 2(b), the short-circuit current flowing in each of the core materials 201 and 202 flows in a perpendicular direction to the thickness direction of each of the core materials 201 and 202 (see the arrows shown in FIGS. 2(a) and 2(b)).

As shown in FIGS. 2(a) and 2(b), when the nail N is stuck in the battery and an internal short-circuit occurs, a current flows from a positive electrode to a negative electrode via the nail N due to a discharge reaction. The reaction at this time is a discharge reaction and proceeds in entire surfaces of the electrodes. In the positive electrode, most currents flow toward the nail N through the aluminum core material 202. That is, in the positive electrode core material 202, currents concentrates and a current density is the highest in a part thereof being in contact with a surface of the nail N. Specifically, when, as shown in FIG. 2(b), the positive electrode core material 202 is concentrically divided into segments P1, P2 and P3, each having a predetermined width, so that the nail N is a center point, the current density becomes higher in a closer segment of the segments P1, P2 and P3 to the center point (more specifically, for example, in the direction from the segment P3 to the segment P1). Accordingly, Joule heat becomes higher in the same direction.

However, a the temperature of the core material actually becomes the highest in a part of the positive electrode core material 202 extending a little outside of the surface of the nail N (see the segment P1 part of FIG. 2(b)). In general, a reason for this is considered that the nail N itself, which causes an internal short-circuit, has a high heat radiation property and serves as a heat radiator, so that the temperature of the part of the positive electrode core material 202 being in contact with the surface of the nail N is reduced.

Assuming that a cross section area is Aa, a length is ΔLa, and a fixed resistance is ρa, a resistance Ra of a predetermined part of the aluminum electrode core material 202 (i.e., a part surrounded by a circumference of a circle at a predetermined radial distance from the nail N as the center of the circle) is expressed by Formula 2.

$$Ra = (\Delta La \cdot \rho a)/Aa \quad \text{[Formula 2]}$$

A calorific value Wa when the current in Formula 1 flows in a core material with the resistance of Formula 2 is expressed by Formula 3.

$$Wa = I^2 Ra = (V^2 \cdot \Delta La \cdot \rho a)/(Rr^2 \cdot Aa) \quad \text{[Formula 3]}$$

Assuming that a time in which the current flows is t, generated heat Qa is expressed by Formula 4.

$$Qa = Wa \cdot t = (V^2 \cdot \Delta La \cdot \rho a \cdot t)/(Rr^2 \cdot Aa) \quad \text{[Formula 4]}$$

Assuming that a specific gravity of the core material is da, the weight of the core material is expressed by ΔLa·Aa·da. Furthermore, assuming that a heat capacity coefficient of the core material is Ca (J/g·K), a heat capacity of the predetermined part of the aluminum core material is expressed by Ca·ΔLa·Aa·da. In this case, assuming that the change in temperature of the core material is ΔTa, the following formula holds.

$$\Delta Ta = (V^2 \cdot \rho a \cdot t)/(Rr^2 \cdot Aa^2 \cdot Ca \cdot da) \quad \text{[Formula 5a]}$$

In this formula, Aa denotes a cross section area of the core material. Since the cross section area is proportional to the thickness of the core material, the change in temperature of the core material is inversely proportional to the square of the thickness of the core material.

In the negative electrode core material, the current flows in the reverse direction to the direction in which the current flows in the positive electrode core material. According to the same idea as in the case of the positive electrode core material, the change in temperature of the copper core material ΔTc is expressed by Formula 5b.

$$\Delta Tc = (V^2 \cdot \rho c \cdot t)/(Rr^2 \cdot Ac^2 \cdot Cc \cdot dc) \quad \text{[Formula 5]}$$

where ρc is a fixed resistance of copper, Cc is a heat capacity coefficient and dc is a specific gravity of copper.

Figure 3:
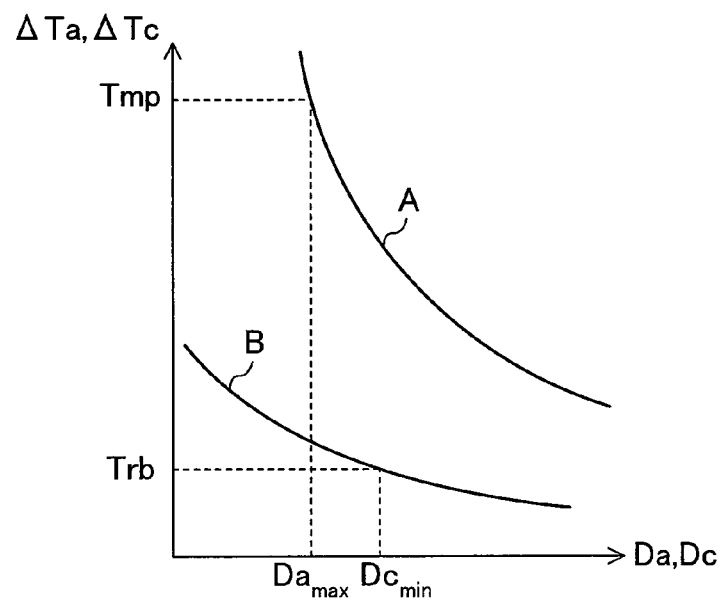
FIG. 3 is a graph showing the relationship between each of respective thicknesses of an aluminum core material and a copper core material and the temperature increase.

For the aluminum core material, a curb A of FIG. 3 can be obtained by plotting the temperature change ΔTa at the ordinate and the thickness Da at the abscissa, based on Formula 5a.

On the other hand, a curb B of FIG. 3 can be obtained by plotting the temperature change ΔTc at the ordinate and the thickness Dc at the abscissa, based on Formula 5b.

Note that voltage V, time t and reaction resistance Rr are the same in Formula 5a and Formula 5b and thus are not taken into consideration. On the other hand, the fixed resistances ρa and ρc are different to each other, the heat capacity coefficients Ca and Cc are different to each other and the specific gravities da and dc are different to each other. Therefore, all of these physical constants are taken into consideration.

Physical coefficients ρa, Ca and da which constitutes Formula 5a and physical coefficients ρc, Cc and dc which constitutes Formula 5b are as follows.

$\rho a = 2.75 \times 10^{-8}\ \Omega m$
$Ca = 905\ J/kg^\circ\ C.$
$da = 2688\ kg/m^3$
$\rho c = 1.694 \times 10^{-8}\ \Omega m$
$Cc = 387\ J/kg^\circ\ C.$
$dc = 8800\ kg/m^3$ In this case, to increase the temperature of the aluminum core material to a fusing temperature Tmp before the temperature of the copper core material reaches a reaction start temperature Trb of a reaction between the electrolyte and the negative electrode mixture layer, as shown in FIG. 3, the thickness of the copper material has to be larger than Dcmin which is the thickness of the copper core material at a time when the temperature of the copper core material reaches the reaction start temperature Trb. On the other hand, the thickness of the aluminum core material has to be smaller than Damax which is the thickness of the aluminum core material at a time when the temperature of the aluminum core material reaches the fusing temperature Temp. That is, the thickness Da of the aluminum core material and the thickness Dc of the copper core material have to satisfy the relationship of Da<Dc.

Note that when the thickness Da of the aluminum core material is in a range of, for example, 10-50 μm, which is normally used, the thickness Da of the aluminum core material and the thickness Dc of the copper core material are preferably in a range of $1.2 \leq Dc/Da \leq 2$. If Dc/Da is 1.2 or more, the temperature of the aluminum core material can be rapidly increased, compared to the temperature of the copper core material, to reliably burn off the aluminum core material. Moreover, when Dc/Da is 2 or less, in other words, when the thickness of the copper core material is equal to or smaller than the double of the thickness of the aluminum core material, the copper core material is formed in a foil shape. Thus, in the winding step for a battery, inconveniences (such as, for example, difficulty in winding and the like) are not caused.

Known high power lithium ion secondary batteries are designed so that the thickness Da of the positive electrode current collector is larger than the thickness Dc of the negative electrode current collector for the following reasons.

A first reason is that because aluminum has a large fixed resistance, compared to copper, in order to ensure the same resistance for the positive electrode current collector and the negative electrode current collector, the relationship of Da>Dc is preferably satisfied. A second reason is that because aluminum has a small strength, compared to copper, considering design strength in process steps, it is preferable to design Da to be larger than Dc. A third reason is that because aluminum has a small density, compared to copper, considering reduction in weight of a battery, it is preferable to design Dc to be smaller than Da. In addition, because aluminum is inexpensive, compared to copper, designing Dc to be smaller than Da satisfies the need to reduce production costs. For the above-described reasons, in known lithium ion secondary batteries, the thickness Da of the positive electrode current collector is designed to be larger than the thickness Dc of the negative electrode current collector.

In such a known lithium ion secondary battery satisfying Da>Dc, when an internal short-circuit occurs, the temperature of the positive electrode current collector can not be increased to a fusing temperature to fuse and cut the positive electrode current collector at a moment before the temperature of the negative electrode current collector reaches a reaction start temperature of a reaction between the electrolyte and the negative electrode mixture layer. Therefore, there is a possibility that a chain exothermic reaction between the electrolyte and the negative electrode mixture layer occurs, so that the temperature inside of the battery is increased and, finally, a chain thermal decomposition reaction of the positive electrode active materials occurs to cause fume emission of the battery.

Figure 4:
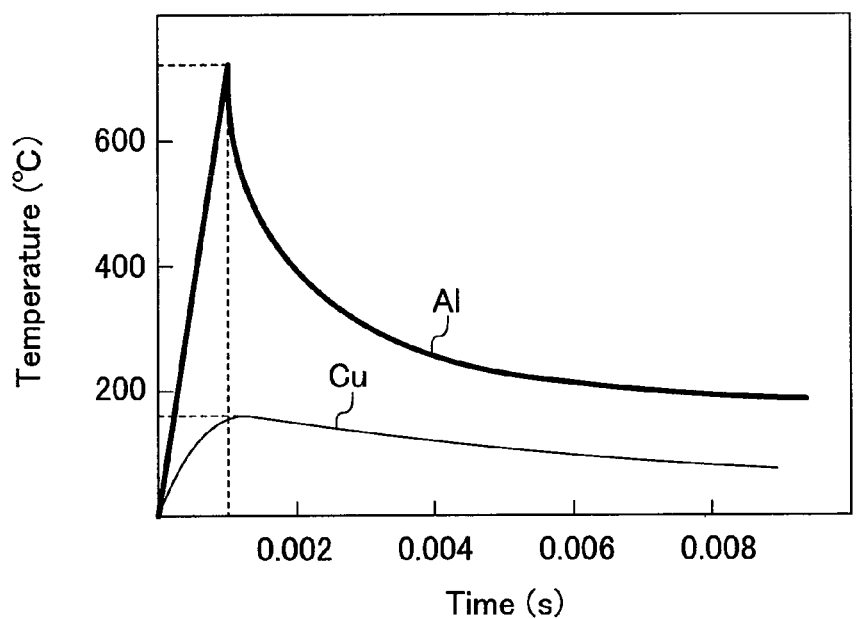
FIG. 4 is a graph showing temperature change for the aluminum core material and the copper core material with time.

Hereafter, when a nail is stuck into the lithium ion secondary battery of the present invention, i.e., a battery designed to satisfy the relationship of Da<Dc, the relationship between lapse time from a time when the nail is stuck and temperature change for each of the core materials will be described with reference to FIG. 4. FIG. 4 is a graph showing temperature change for the aluminum core material and the copper core material with time. In this case, considering heat radiation by the nail itself, in each of the core materials, the temperature is increased the most around the nail. Therefore, the temperature of each of the core materials shown in FIG. 4 is specifically a temperature of a part of each of the core materials located around the nail.

The lithium ion secondary battery of the present invention is designed so that the thickness Da of the positive electrode current collector is smaller than the thickness Dc of the negative electrode current collector.

As described above, by making Da and Dc satisfy Da<Dc, the temperature of the positive electrode current collector can be set to be much higher than the temperature of the negative electrode current collector when a nail is stuck therein. Specifically, as shown in FIG. 4, at a time when the temperature of the positive electrode current collector reaches the fusing temperature of aluminum, i.e., about 650° C., the temperature of the negative electrode current collector is about 180° C., which is lower than the reaction start temperature of a reaction between the electrolyte and the negative electrode mixture layer (lithium intercalated in the negative electrode), i.e., 250° C.

In the lithium ion secondary battery of the present invention, the temperature of the negative electrode current collector at a time when the positive electrode current collector is fused and cut is about 250° C. or less. Therefore, a short-circuited part in the positive electrode current collector can be fused and cut at a moment before an exothermic reaction between the electrolyte and the negative electrode mixture layer is started.

As has been described, the lithium ion secondary battery of the present invention is designed so that the thickness Da of the positive electrode current collector containing aluminum as a principle component is smaller than the thickness Dc of the negative electrode current collector containing copper as a principle component. Thus, even if an internal short-circuit occurs in the battery due to an internal or external physical impact, the temperature of the positive electrode current collector (aluminum core material) can be increased to the fusing temperature, by utilizing Joule heat, before the temperature of the negative electrode current collector (copper core material) reaches the reaction start temperature of a reaction between the electrolyte and the negative electrode mixture layer to fuse and cut a short-circuited part in the positive electrode current collector at a moment. Accordingly, before reaction heat due to an exothermic reaction between the electrolyte and the negative electrode mixture layer is generated, a short-circuit resistance can be increased to reduce a short-circuit current, so that Joule heat can be reduced and thus an increase in temperature of the entire battery can be suppressed. Therefore, the occurrence of fume emission of the battery can be prevented, thus resulting in improvement of safety of the battery.

The description above has been made with reference to the lithium ion secondary battery including the positive electrode plate, the negative electrode plate and the separator as a specific example. However, the present invention is not limited thereto but may be applied to a lithium ion secondary battery including a positive electrode, a negative electrode, a nonaqueous electrolyte, and a porous heat-resistant layer provided between a positive electrode plate and a negative electrode plate. In such case, if a nail sticking speed is slow in sticking a nail, a burr is generated as the nail enters into the positive and negative electrode plates. Accordingly, a direct short-circuit between the positive electrode plate and the negative electrode plate can be easily caused. To cope with this, a porous heat-resistant layer is provided between the positive electrode plate and the negative electrode plate, so that a direct short-circuit between the positive electrode plate and the negative electrode plate can be avoided. This allows further improvement of safety of the battery. Moreover, in view of heat resistance property, the porous heat-resist layer preferably contains an inorganic oxide filler or heat-resistant resin of which thermal deformation temperature is 200° C. or more.

Thereafter, the best mode for carrying out the present invention will be described with reference to the accompanying drawings.

Figure 5A:
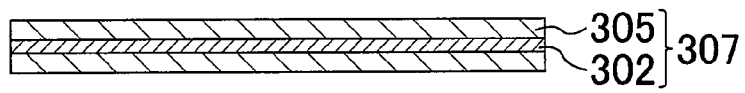
FIG. 5(a) is a cross-sectional view illustrating a positive electrode plate and FIG. 5(b) is a plan view of the positive electrode plate.
Figure 5B:
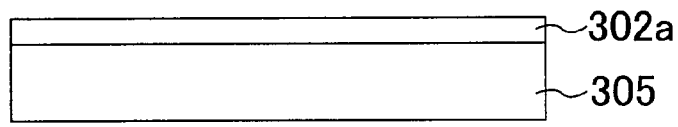
Figure 5C:
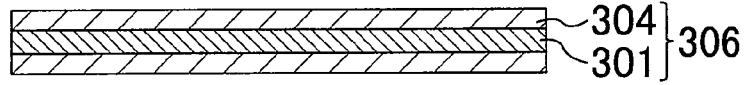
FIG. 5(c) is a cross-sectional view illustrating a negative electrode plate and FIG. 5(d) is a plan view of the negative electrode plate.
Figure 5D:
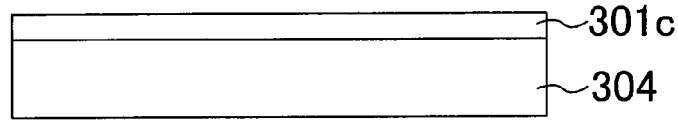

FIGS. 5(a) through 5(d) are views illustrating a positive electrode plate and a negative electrode plate constituting a lithium ion secondary battery according to the present invention. Specifically, FIG. 5(a) is a cross-sectional view illustrating the positive electrode plate and FIG. 5(b) is a plan view of the positive electrode plate. FIG. 5(c) is across-sectional view illustrating the negative electrode plate and FIG. 5(d) is a plan view of the negative electrode plate.

As shown in FIG. 5(a), a positive electrode plate 307 includes a positive electrode current collector 302 and a positive electrode mixture layer 305 formed on each of both surfaces of the positive electrode current collector 302. As shown in FIG. 5(c), a negative electrode plate 306 includes a negative electrode current collector 301 and a negative electrode mixture layer 304 formed on each of both surfaces of the negative electrode current collector 301. In view of assembling and welding after formation of an electrode group, as shown in FIGS. 5(b) and 5(d), exposed portions 302a and 301c in which the mixture layers 305 and 304 do not exist are provided in the electrode plates, respectively, so that each of the exposed portions 302a and 301c is located at one end of an associated one of the current collectors along a long side direction thereof.

Figure 6:
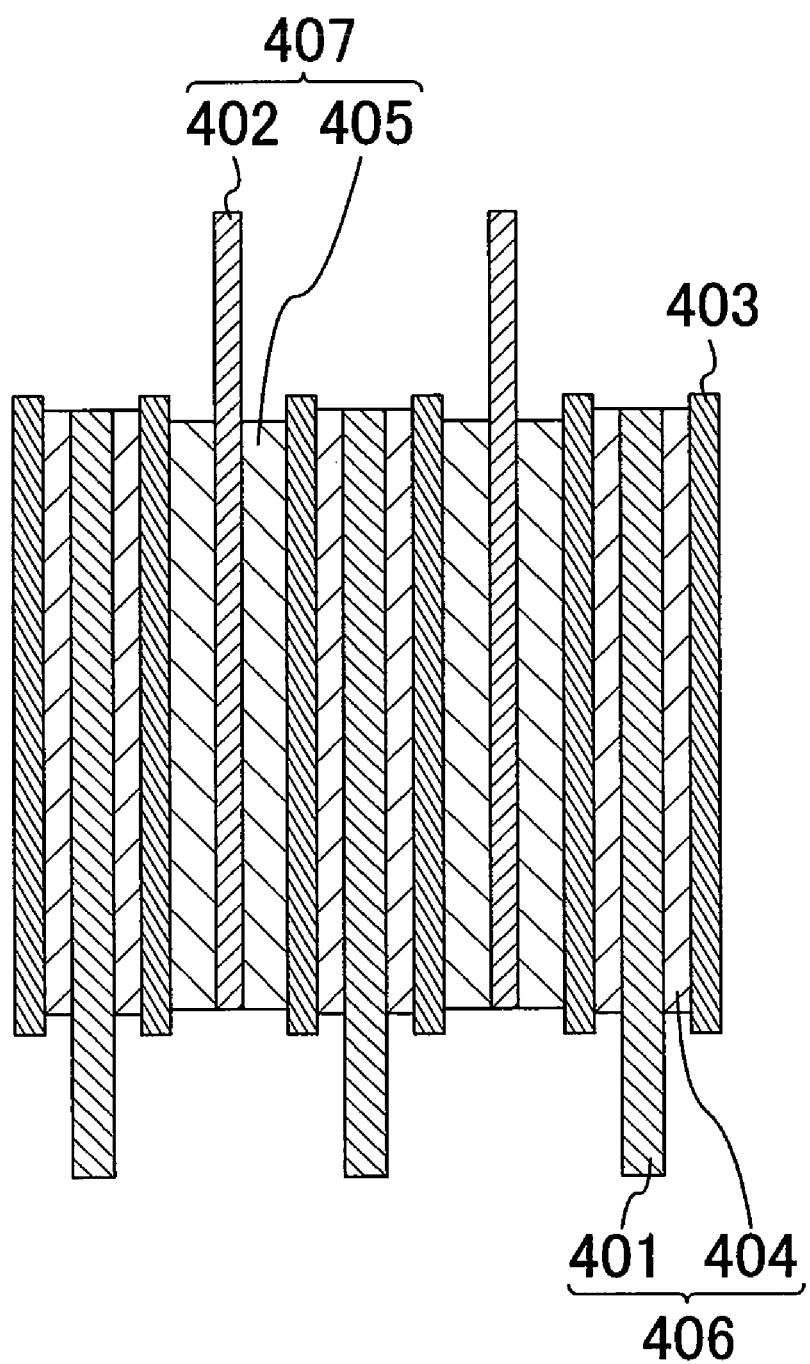
FIG. 6 is a longitudinal sectional view illustrating an electrode group for a lithium ion secondary battery according to the present invention.

FIG. 6 is a longitudinal sectional view illustrating an electrode group for a lithium ion secondary battery according to the present invention. As shown in FIG. 6, a positive electrode plate 407 and a negative electrode plate 406 are spirally wound so as to face each other with a separator 403 interposed therebetween. In this case, in order to make the area of the negative electrode plate 406 larger than that of the positive electrode plate 407 which is a capacity control electrode, a negative electrode mixture layer 404 is formed so that its entire surface fully faces a positive electrode mixture layer 405.

The positive electrode plate 407 will be hereafter described. As a positive electrode active material, for example, lithium compound oxide such as lithium nickel oxide, lithium cobalt oxide and the like can be used. The positive electrode active material is mixed with a conductive material and a binder and is applied as a positive electrode paste to a positive electrode current collector 402. Then, the positive electrode paste is dried, rolled to a predetermined thickness, and cut into pieces with predetermined dimensions, thereby obtaining a positive electrode plate 407. As the conductive material, metal powder stable at a positive electrode potential, for example, carbon black such as acetylene black (hereafter referred to as AB) or a graphite material can be used. In this embodiment, as the binder, a material stable at a positive electrode potential, for example, PVDF, denatured acrylic rubber, polytetrafluoroethylene or the like can be used. Furthermore, as a thickening agent to stabilize the positive electrode paste, for example, cellulose resin such as carboxymethyl cellulose (hereafter referred to as CMC) or the like may be used. In this embodiment, as the positive electrode current collector 402, an aluminum foil, which is a stable material at a positive electrode potential, is used.

The negative electrode plate 406 will be hereafter described. As the negative electrode active material, a material capable of storing lithium can be used. Specifically, for example, at least one material can be selected from graphite, silicide, a titanium alloy material and the like. Examples of the negative electrode active material for a nonaqueous electrolyte secondary battery include, for example, metal, metal fiber, a carbon material, oxide, nitride, silicon compound, tin compound, or various metal alloys. Specifically, an elemental material such as silicon (Si) and tin (Sn), silicon compound or tin compound in the form of an alloy, a compound, a solid solution and the like are preferable because they have a large capacity density. More specifically, examples of a carbon material include, for example, various types of natural graphite, coke, semi-graphitized carbon, carbon fiber, spherical carbon, various kinds of artificial graphite, amorphous carbon and the like. Examples of silicon compound include, for example, $SiO_x$ (0.05<x1.95), an alloy, a compound and a solid solution obtained by replacing part of Si of $SiO_x$ (0.05<x1.95) with at least one element selected from the group consisting of B, Mg, Ni, Ti, Mo, Co, Ca, Cr, Cu, Fe, Mn, Nb, Ta, V, W, Zn, C, N and Sn, and the like. Examples of tin compound include, for example, $Ni_2Sn_4$, $Mg_2Sn$, $SnO_x$ (0<x<2), $SnO_2$, $SnSiO_3$ and the like. As the negative electrode active material, one of the above-described materials may be independently used or combination of two or more of the above-described materials may be used.

The negative electrode active material is mixed with a binder and applied as a negative electrode paste to a negative electrode current collector 401. Then, the negative electrode paste is dried, rolled to a predetermined thickness, and cut into pieces with predetermined dimensions, thereby obtaining a negative electrode plate 406. In this embodiment, as a material stable at a negative electrode potential, for example, PVDF, styrene-butadiene rubber copolymer (hereafter referred to as SBR) and the like can be used. Furthermore, as a thickening agent to stabilize the negative electrode paste, for example, cellulose resin such as CMC or the like may be used.

In this embodiment, as the negative electrode current collector 401, a copper foil, which is a stable material at a negative electrode potential, is used.

The separator 403 will be hereafter described. The separator has the capability of storing the electrolyte. As the separator, a microporous film stable either at a positive electrode potential or a negative electrode potential can be used. Specifically, for example, polypropylene (hereafter, referred to as PP), polyethylene, polyimide, polyamide and the like can be used.

The porous heat-resistant layer disposed between the positive electrode plate 407 and the negative electrode plate 406 will be hereafter described. As the porous heat-resistant layer, for example, an insulation filler can be used. Specifically, an inorganic oxide filler is preferably used. It is preferable to select, as the inorganic oxide filler, a chemically stable, highly pure filler which does not cause adverse side effects to battery properties even under the condition where a battery is immersed in an organic electrolyte when the battery is in use and at an oxidation reduction potential. The specific examples of such inorganic oxide filler include, for example, inorganic porous materials such as alumina, zeolite, silicon nitride, silicon carbide, titanium oxide, zirconium oxide, magnesium oxide, zinc oxide, silicon dioxide and the like.

As another example of the porous heat-resistant layer, for example, heat-resistant resin can be used. The thermal deformation temperature (load-deflection temperature at 1.82 MPa in Test method ASTM-D648) of the heat-resistant resin is preferably 200° C. or more. Specific examples of the heat-resistant resin include, for example, polyimide, polyamid imide, aramid, polyphenyl sulfide, polyether imide, polyethylene terephthalate, polyether nitrile, polyether ether ketone, polybenzoimidazole, and the like.

By adding an inorganic oxide filler to the porous heat-resistant layer, the heat resistance of the porous heat-resistant layer can be further improved. It is preferable to select, as the inorganic oxide filler, a chemically stable, highly pure filler which does not cause adverse side effects to battery properties even under the condition where a battery is immersed in an organic electrolyte when the battery is in use and at a redox potential. Specific examples of the inorganic oxide filler include, for example, inorganic porous materials such as alumina, zeolite, silicon nitride, silicon carbide, titanium oxide, zirconium oxide, magnesium oxide, zinc oxide, silicon dioxide and the like.

Hereafter, each example of the present invention will be described in detail.

Working Example 1

A method for producing a battery according to Working Example 1 will be hereafter described in detail.

SBR in 1 weight part in terms of solid content and CMC in 1 weight part in terms of solid content were added to artificial graphite in 100 weight part and an obtained mixture was dispersed with an adequate amount of water by a double-armed mixer, thereby forming a negative electrode paste. The negative electrode paste (which will be dried to be formed as a negative electrode mixture layer) was applied to each of both surfaces of a copper foil (negative electrode current collector) having a thickness of 12 μm and dried, so that a copper exposed portion having a width of 5 mm was continuously formed in one end of the negative electrode current collector along a long side direction. Thereafter, the negative electrode current collector was rolled so as to have a thickness of 105 μm as a whole and was cut into pieces having a width of 55 mm (the width of the mixture layer was 50 mm) and a length of 1400 mm, thereby forming a negative electrode plate. Note that in part of the copper foil on which the negative electrode mixture layer was applied, the amount of the applied mixture with respect to the area of each surface was 6 mg/cm$^2$.

CMC in 0.5 weight part in terms of solid content and acetylene black compound oxide in 2.5 weight part were added to lithium nickel compound oxide, expressed by the composite formula $LiNi_{0.78}Co_{0.17}Al_{0.05}O_2$, in 100 weight part and an obtained mixture was dispersed with an adequate amount of water by a double-arm mixer, thereby forming a positive electrode paste. The positive electrode paste (which will be dried to be formed as a positive electrode mixture layer) was applied to each of both surfaces of an aluminum foil (positive electrode current collector) having a thickness of 10 μm and dried, so that an aluminum exposed portion having a width of 5 mm was continuously formed in one end of the positive electrode current collector along a long side direction thereof. Thereafter, the positive electrode current collector was rolled so as to have a thickness of 100 μm as a whole and cut into pieces having a positive electrode plate having a width of 53 mm (the width of the mixture layer was 48 mm) and a length of 1300 mm, thereby forming a positive electrode plate. Note that in part of the aluminum foil on which the positive electrode mixture layer was applied, the amount of the applied mixture with respect to the area of each surface was 9 mg/cm$^2$.

Thereafter, the negative electrode plate and the positive electrode plate were spirally wound with a PP porous film having a thickness of 20 μm interposed therebetween, thereby obtaining an electrode group.

Thereafter, a positive electrode current collector terminal and a negative electrode current collector terminal were resistance-welded on an upper end and a lower end of the electrode plate group, respectively. Subsequently, the electrode plate group was inserted into a cylindrical metal case with a bottom, having a diameter of 22 mm and a height of 65 mm, and also an electrolyte prepared by dissolving $LiPF_6$ at a concentration of 1 mol/l in a solvent of EC:DEC:DMC=20:40:40 (volume %) was injected in the metal case. Thereafter, an opening portion of the metal case was sealed, thereby completing a lithium ion secondary battery having a capacity of 1.8 Ah. The completed battery was assumed to be a battery of Working Example 1.

Working Example 2

A battery formed in the same manner as in Working Example 1, except that the copper foil was formed so as to have a thickness of 14 μm, was assumed to be a battery of Working Example 2.

Working Example 3

A battery formed in the same manner as in Working Example 1, except that the copper foil was formed so as to have a thickness of 16 μm, was assumed to be a battery of Working Example 3.

Working Example 4

A battery formed in the same manner as in Working Example 1, except that the aluminum foil was formed so as to have a thickness of 20 μm and the copper foil was formed so as to have a thickness of 24 μm, was assumed to be a battery of Working Example 4.

Working Example 5

A battery formed in the same manner as in Working Example 1, except that the aluminum foil was formed so as to have a thickness of 25 µm and the copper foil was formed so as to have a thickness of 30 µm, was assumed to be a battery of Working Example 5.

Working Example 6

A battery formed in the same manner as in Working Example 1, except that the aluminum foil was formed so as to have a thickness of 30 µm and the copper foil was formed so as to have a thickness of 36 µm, was assumed to be a battery of Working Example 6.

Working Example 7

A battery formed in the same manner as in Working Example 1, except that the copper foil was formed so as to have a thickness of 11 µm, was assumed to be a battery of Working Example 7.

Comparative Example 1

A battery formed in the same manner as in Working Example 1, except that the copper foil was formed so as to have a thickness of 8 µm, was assumed to be a battery of Comparative Example 1.

Comparative Example 2

A battery formed in the same manner as in Working Example 1, except that the copper foil was formed so as to have a thickness of 10 µm, was assumed to be a battery of Comparative Example 2.

Comparative Example 3

A battery formed in the same manner as in Working Example 1, except that the aluminum foil was formed so as to have a thickness of 35 µm and the copper foil was formed so as to have a thickness of 42 µm, was assumed to be a battery of Comparative Example 3.

—Nail Sticking Test 1—

A nail sticking test was performed to each of the respective batteries of Working Examples. Conditions of the nail sticking test will be simply described below. An iron nail having a diameter of 3 mm was used. The nail was stuck in a center portion of a side surface of the cylindrical metal case so as to completely pass through the metal case along the diameter direction.

For each of batteries of Working Examples 1, 2, 3 and 7 and Comparative Examples 1 and 2, 40 cells were prepared and each of the prepared batteries was charged to 4.2 V by a current of 360 mA. Then, a nail sticking test was performed to 20 cells out of 40 cells for each of the batteries under the condition where the nail sticking speed was 50 mm/s and the temperature was 25° C. and also a nail sticking test was performed to the other 20 cells for each of the batteries under the condition where the nail sticking speed was 50 mm/s and the temperature was 65° C. Test results are shown in Table 1 below.

Moreover, 20 cells of each of batteries of Working Examples 4, 5 and 6 and Comparative Example 3 were prepared and each of the prepared batteries was charged to 4.2 V by a current of 360 mA. Then, a nail sticking test was performed to each of the 20 cells for each of the batteries under the condition where the nail sticking speed was 50 mm/s and the temperature was 65° C. Test results are shown in Table 2 below. Herein, 65° C. is assumed to be a temperature to which a battery is possibly exposed. Specifically, for example, this temperature corresponds to a temperature in a HEV vehicle left under a scorching sun in a desert region. Note that in Table 1 and Table 2, Da denotes the thickness of an aluminum foil (aluminum core material) and Dc denotes the thickness of the copper foil (copper core material).

TABLE 1

|  | Da (µm) | Dc/Da | Excessive Heating 25° C. | Excessive Heating 65° C. | Fume Emission 25° C. | Fume Emission 65° C. |
|---|---|---|---|---|---|---|
| Working Example 1 | 10 | 1.2 | 0 cell | 0 cell | 0 cell | 0 cell |
| Working Example 2 | 10 | 1.4 | 0 cell | 0 cell | 0 cell | 0 cell |
| Working Example 3 | 10 | 1.6 | 0 cell | 0 cell | 0 cell | 0 cell |
| Working Example 7 | 10 | 1.1 | 0 cell | 0 cell | 0 cell | 0 cell |
| Comparative Example 1 | 10 | 0.8 | 0 cell | 0 cell | 0 cell | 6 cells |
| Comparative Example 2 | 10 | 1.0 | 0 cell | 0 cell | 0 cell | 5 cells |

TABLE 2

|  | Da (µm) | Dc/Da | Excessive Heating | Fume Emission |
|---|---|---|---|---|
| Working Example 4 | 20 | 1.2 | 0 cell | 0 cell |
| Working Example 5 | 25 | 1.2 | 0 cell | 0 cell |
| Working Example 6 | 30 | 1.2 | 0 cell | 0 cell |
| Comparative Example 3 | 35 | 1.2 | 0 cell | 3 cells |

As shown in Table 1 and Table 2, as for Comparative Examples 1 and 2, there were some batteries in which excessive heating did not occur but fume emission occurred when a nail sticking test was performed at a temperature of 65° C. In contrast, as for Working Examples 1, 2, 3 and 7, there was no battery at all in which excessive heating and fume emission occurred, and the high safety standard was ensured. It is considered that the reason for this is that a short-circuited portion in the aluminum core material was fused and cut at a moment after the occurrence of the short-circuit due to Joule heat caused by a short-circuit current flowing when a short-circuit occurred (i.e., the nail was stuck in the battery) and, accordingly, the short-circuit resistance was increased and the short-circuit current was reduced.

As for Comparative Examples 1 and 2, batteries in which fume emission occurred when the nail sticking test was performed at a temperature of 65° C. were observed. It is considered that the reason for this is that in the batteries of Comparative Examples 1 and 2, the thickness of the copper core material was smaller, compared to the batteries of Working Examples 1, 2, 3 and 7 and, accordingly, the temperature of the copper core material was largely increased due to Joule heat and was further increased due to reduction in heat radiation property of the copper core material. Thus, the temperature of the copper core material reached a reaction start temperature of a reaction between the negative electrode mixture layer and the electrolyte, so that a reaction between the negative electrode mixture and the electrolyte was started and, finally, fume emission of the battery occurred.

Since the aluminum core material was fused and cut, it can be inferred that the temperature of the aluminum core material reached a high temperature equal to or higher than the fusing temperature (650° C.) of aluminum. As shown in Table 1, it is understood that even when the aluminum core material reaches such high temperature, in the batteries of Comparative Examples 1, 2, 3 and 7, a thermal decomposition reaction of the positive electrode active material does not develop in a chain reaction manner (i.e., the battery did not reach fume emission). It is considered that the reason for this is that since the aluminum core material was fused and cut in a very short time after the occurrence of a short-circuit, the temperature of the positive electrode mixture layer itself did not reach the thermal decomposition temperature of the positive electrode active material. Even if the temperature of the positive electrode mixture layer was increased to reach the thermal decomposition temperature, a thermal decomposition reaction was started only in a part of the positive electrode active material.

From the results shown in Table 1, it is understood that when the relationship between the thickness Da of the aluminum core material (aluminum foil) and the thickness Dc of the copper core material (copper foil) satisfies Da<Dc, the present invention is effective in preventing fume emission of a battery at a time when a nail is stuck in the battery.

However, as shown in Table 2, as for batteries of Comparative Example 3, i.e., batteries in which an aluminum foil having a thickness of 35 μm was used, a small number of batteries in which fume emission occurred were observed. As shown by this result, it is understood that even with Da and Dc satisfying the relationship of Da<Dc, when the thickness of the aluminum foil exceeds 30 μmm, the effect of increasing the safety of the battery is reduced. It is considered that the reason for this is that when the aluminum core material has a large thickness, it takes a long time from the occurrence of a short-circuit to fuse and cut the aluminum core material. Accordingly, the temperature of the positive electrode mixture layer or the temperature of the negative electrode mixture layer is increased until the aluminum core material is fused and cut, so that a chain thermal decomposition reaction of the positive electrode active material and an exothermic reaction between the negative electrode mixture layer and the electrolyte proceeds.

It is inferred from the above-described results that in a battery having a weight power density of 1700 W/kg or more, to fuse and cut a short-circuited part in the negative electrode current collector at a moment before a chain exothermic reaction between the negative electrode mixture layer and the electrolyte occurs, the relationship between the thickness Da of the aluminum core material (aluminum foil) and the thickness Dc of the copper core material (copper foil) has to satisfy Da<Dc and, furthermore, Da is preferably 30 μm or less. However, the thickness of the aluminum core material is smaller than 8 μm, the mechanical strength of the aluminum core material itself is reduced, and inconveniences occur due to fracture of the core material in the step of applying the positive electrode mixture layer to the aluminum core material, thus resulting in drastic reduction in production yield. Therefore, the thickness Da of the aluminum core material is appropriately made to be 8 μm or more and 30 μm or less.

Next, a nail sticking test was performed to batteries each including a positive plate, a negative plate, a nonaqueous electrolyte, and a porous heat-resistant layer provided between the positive electrode plate and the negative electrode plate to check the effect of improving the safety of the batteries.

Working Example 8

An example in which an inorganic oxide filler was used as a porous heat-resistant layer will be described. The inorganic oxide filler includes basic solid particles containing α-alumina and a compound binder made of a plurality of kinds of resin materials. More specifically, the compound binder includes a major binder made of polyethersulphone and a supplement binder made of polyvinylpyrrolidone. In Working Example 8, a porous film paste including the basic solid particles and the compound mixture at a ratio of 97:3 in weight was applied to each of both surfaces of the negative electrode current collector of Working Example 1 to a thickness of 20 μm with the negative electrode mixture layer interposed therebetween and dried. Thus, the negative electrode plate in which the porous heat-resistant layer made of an inorganic oxide filler was provided on the both surfaces thereof was obtained. A battery formed in the same manner as in Working Example 1, except that the above-described negative electrode plate was used, was assumed to be a battery of Working Example 8.

Working Example 9

The porous film paste used in Working Example 8 was applied to each of both surfaces of the positive electrode current collector of Working Example 1 to a thickness of 20 μm with the positive electrode mixture interposed therebetween and dried. Thus, a positive electrode plate in which the porous heat-resistant layer made of an inorganic oxide filler was provided on the both surfaces thereof was obtained. A battery formed in the same manner as in Working Example 1, except that the above-described positive electrode plate was used, was assumed to be a battery of Working Example 9.

Working Example 10

As in Working Example 8 or 9, without providing a porous heat-resistant layer on the negative electrode mixture layer or the positive electrode mixture layer, the porous film paste used in Working Example 8 was applied to a polyethylene polypropylene compound film (2300 available from Celgard Inc.) having a thickness of 20 μm and dried. Thus, a porous film including a porous heat-resistant layer made of an inorganic filler having a thickness of 5 μm (i.e., a separator in which the porous heat-resistant layer was provided) was obtained. A battery formed in the same manner as in Working Example 1, except that the above-described separator was used, was assumed to be a battery of Working Example 10.

Working Example 11

An example where aramid resin which is heat-resistant resin was used as a porous heat-resistant layer will be described. Aramid resin (KEVLAR available from Duponi-Toray Co., LTD., (cut fiber length: 3 mm, a load-deflection temperature (thermal deformation temperature) in Test method ASTM-D648 (at 1.82 MPa)>320° C.)) was uniformly dissolved in N-methyl pyrrolidone (hereafter referred to as NMP) at 80° C. Thereafter, while sufficiently stirring the NMP solution containing aramid resin, lithium chloride powder (available from Kanto Chemical Co., LTD.) was dissolved therein, thereby preparing an aramid lithium chloride NMP mixed solution. In this example, aramid resin, NMP and lithium chloride powder were mixed at a ratio of 20:80:1 in weight. Thereafter, the aramid lithium chloride NMP mixed solution was applied onto the polyethylene polypropylene compound film (2300 available from Celgard Inc.) heated to be 60° C. and having a thickness of 20 μm, using a barcoater, to a thickness of 100 μm and was dried in a drying furnace at 110° C. for 3 hours, thereby obtaining a white film. The white film was immersed in distilled water in a hot-water bath at 60° C. for 2 hours to dissolve and remove the dried and solidified lithium chloride. Thereafter, the white film was cleaned with purified water, thereby obtaining a porous film having a thickness of 25 μm (i.e., a separator in which a porous heat-resistant layer made of heat-resistant resin having a thermal deformation temperature of 200° C. or more). A battery formed in the same manner as in Working Example 1, except that the separator was used, was assumed to be a battery of Working Example 11.

Working Example 12

An example where aramid resin to which an inorganic oxide filler was added was used as a porous heat-resistant layer will be described. Alumina particles in 200 weight part was added to the NMP solution containing aramid resin of Comparative Example 11 in 100 weight part (in terms of solid content) and the solution was stirred, thereby preparing a dispersion liquid. Thereafter, the dispersion liquid was applied to a polyethylene polypropylene compound film (2300 available from Celgard Inc.) having a thickness of 20 μm, thereby obtaining a porous film having a thickness of 25 μm (i.e., a separator in which a porous heat-resistant layer to which an inorganic oxide filler was added). A battery formed in the same manner as in Working Example 1, except that the above-described separator was used, was assumed to be a battery of Working Example 12.

Working Example 13

An example where a heat-resistant resin whose thermal deformation temperature was 200° C. was used will be described. In the porous film (which is an aramid resin porous film+polyethylene polypropylene compound film) of Working Example 11, using, instead of aramid resin, copolymer of trifluorochlorethylene and vinylidene fluoridea, a porous film (i.e., a separator in which a porous heat-resistant layer made of heat-resistant resin having a thermal deformation temperature of 200° C.) having 25 μm was obtained. A battery formed in the same manner as in Working Example 11, except that the above-described separator was used, was assumed to be a battery of Working Example 13.

Comparative Example 4

A battery formed in the same manner as in Working Example 8, except that a copper foil having a thickness of 8 μm was used, was assumed to be a battery of Comparative Example 4.

Comparative Example 5

A battery formed in the same manner as in Working Example 9, except that a copper foil having a thickness of 8 μm was used, was assumed to be a battery of Comparative Example 5.

Comparative Example 6

A battery formed in the same manner as in Working Example 10, except that a copper foil having a thickness of 8 μm was used, was assumed to be a battery of Comparative Example 6.

Comparative Example 7

A battery formed in the same manner as in Working Example 11, except that a copper foil having a thickness of 8 μm was used, was assumed to be a battery of Comparative Example 7.

—Nail Sticking Test 2—

A nail sticking test was performed to each of the respective batteries of Working Examples. Conditions of the nail sticking test will be simply described below. An iron nail having a diameter of 3 mm was used. The nail was stuck in a center portion of a side surface of the cylindrical metal case so as to completely pass through the metal case along the diameter direction.

For each of batteries of Comparative Example 1, Working Example 1, Working Examples 8 through 13 and Comparative Examples 4 through 7, 120 cells were prepared and each of the prepared batteries was charged to 4.2 V by a current of 360 mA. Then, at a temperature of 25° C., a nail sticking test was performed to 20 cells under the condition where the nail sticking speed was 10 mm/s, to another 20 cells under the condition where the nail sticking speed was 30 mm/s, and to still another 20 cells under the condition where the nail sticking speed was 50 mm/s for each of the batteries. Also, at a temperature of 65° C., a nail sticking test was performed to another 20 cells under the condition where the nail sticking speed was 10 mm/s, to another 20 cells under the condition where the nail sticking speed was 30 mm/s, and to still another 20 cells under the condition where the nail sticking speed was 50 mm/s for each of the batteries. Test results are shown in Table 3 below.

TABLE 3

| Battery | Nail sticking speed (mm/s) | Number of cells in which fume emission occurred | |
|---|---|---|---|
| | | 25° C. | 65° C. |
| Comparative Example 1 | 10 | 0 | 9 |
| | 30 | 0 | 8 |
| | 50 | 0 | 6 |
| Working Example 1 | 10 | 0 | 3 |
| | 30 | 0 | 1 |
| | 50 | 0 | 0 |
| Working Example 8 | 10 | 0 | 0 |
| | 30 | 0 | 0 |
| | 50 | 0 | 0 |
| Working Example 9 | 10 | 0 | 0 |
| | 30 | 0 | 0 |
| | 50 | 0 | 0 |
| Working Example 10 | 10 | 0 | 0 |
| | 30 | 0 | 0 |
| | 50 | 0 | 0 |
| Working Example 11 | 10 | 0 | 0 |
| | 30 | 0 | 0 |
| | 50 | 0 | 0 |
| Working Example 12 | 10 | 0 | 0 |
| | 30 | 0 | 0 |
| | 50 | 0 | 0 |
| Working Example 13 | 10 | 0 | 0 |
| | 30 | 0 | 0 |
| | 50 | 0 | 0 |
| Comparative Example 4 | 10 | 0 | 4 |
| | 30 | 0 | 3 |
| | 50 | 0 | 1 |
| Comparative Example 5 | 10 | 0 | 5 |
| | 30 | 0 | 2 |
| | 50 | 0 | 1 |

TABLE 3-continued

| Battery | Nail sticking speed (mm/s) | Number of cells in which fume emission occurred | |
|---|---|---|---|
| | | 25° C. | 65° C. |
| Comparative Example 6 | 10 | 0 | 6 |
| | 30 | 0 | 2 |
| | 50 | 0 | 1 |
| Comparative Example 7 | 10 | 0 | 5 |
| | 30 | 0 | 2 |
| | 50 | 0 | 2 |

As shown in Table 3, there was no battery in which fume emission occurred when the nail test was performed at 25° C. However, in some batteries among the batteries of Comparative Example 1, Working Example 1 and Comparative Examples 4 through 7, fume emission occurred. There can be seen a tendency that the number of batteries in which fume emission occurred is increased as the nail sticking speed is reduced. It is considered that the reason for this is that when the nail sticking speed is slower, the size of a burr in a part of each electrode plate in which the nail is stuck is increased and, accordingly, a part where the negative electrode plate and the positive electrode plate are directly short-circuited is generated. As for the batteries of Working Examples 8 through 13, there is no battery in which fume emission occurred even under the condition where the nail sticking condition was slow.

It is considered that the reason for this is that with the porous heat-resistant layer provided between the positive electrode plate and the negative electrode plate, even if a burr was generated in a part of each electrode plate through which the nail was stuck due to a slow nail sticking speed, the porous heat-resistant layer serving as an insulation layer could prevent direct contact between the positive electrode plate and the negative electrode plate or keep a contact part of the positive electrode plate and the negative electrode plate to a very small area.

From the results shown in Table 3, it is understood that by providing the porous heat-resistant layer between the positive electrode and the negative electrode in the lithium ion secondary battery of the present invention which satisfies Da<Dc, the safety of the battery can be further improved. Specifically, as for the batteries of Working Example 1, there were a small number of batteries in which fume emission occurred when the nail sticking test was performed at a nail sticking speed of 10 mm/s and also when the nail sticking test was performed at a nail sticking speed of 30 mm/s. In contrast to this, as for the batteries of Working Examples 8 through 13, there was no battery in which fume emission occurred at all. However, as for the batteries of Comparative Examples 4 through 7 each satisfying Da≧Dc (in other words, the batteries which do not satisfy Da<Dc), even if the porous heat-resistant layer was provided between the positive electrode plate and the negative electrode plate, there existed some batteries in which fume emission occurred.

As has been described, by adopting the structure according to the present invention, a lithium ion secondary battery with excellent safety can be provided.

In the above-described working examples, the batteries in which artificial graphite was used as the negative electrode material have been described as specific examples. However, each of the working examples is not limited thereto. For example, when a carbon material such as coke, semi-graphitized carbon, carbon fiber, spherical carbon, amorphous carbon and the like, an elemental material such as silicon (Si) or tin (Sn), silicon compound ($SiO_x$ ($0.05 \leq x \leq 1.95$)), an alloy, a compound and a solid solution obtained by replacing part of Si of $SiO_x$ ($0.05<x1.95$) with at least one element selected from the group consisting of B, Mg, Ni, Ti, Mo, Co, Ca, Cr, Cu, Fe, Mn, Nb, Ta, V, W, Zn, C, N and Sn, or tin compound ($Ni_2Sn_4$, $Mg_2Sn$, $SnO_x$ ($0<x<2$), $SnO_2$, $SnSiO_3$) is used, instead of artificial graphite, or when combination of two or more of the above-described materials is used, instead of artificial graphite, the safety of a battery can be improved.

Moreover, this embodiment has been described using, as a specific example, the case where an internal short-circuit occurs in a battery due to an external physical impact (specifically, sticking of a nail). However, the present invention is not limited thereto but, for example, also when an internal short-circuit occurs in a battery due to an internal physical impact, specifically, a metallic foreign substance mixed in the battery in steps for producing the battery, the safety of the battery can be improved.

Moreover, this embodiment has been described using, as a specific example, a lithium ion secondary battery including an electrode plate group for a lithium ion secondary battery, including a negative electrode plate, a positive electrode plate and a separator spirally wound therein. However, the present invention is not limited thereto but, even in a lithium ion secondary battery including an electrode plate group for a lithium ion secondary battery, including a negative electrode plate, a positive electrode plate and a separator stacked therein, the safety of the battery can be improved.

INDUSTRIAL APPLICABILITY

As has been described, the present invention is highly applicable and useful as a technique for increasing the safety of overall high power lithium ion secondary batteries including an electrode plate group formed so as to be spirally wound or have a stacked structure.

The invention claimed is:

1. A lithium ion secondary battery which comprises:

a negative electrode plate in which a negative electrode mixture layer is formed on each of both surfaces of a negative electrode current collector containing copper as a principle component and having a sheet shape;

a positive electrode plate in which a positive electrode mixture layer is formed on each of both surfaces of a positive electrode current collector containing aluminum as a principle component and having a sheet shape; and a separator holding an electrolyte, the negative electrode plate, the positive electrode plate and the separator being spirally wound or stacked, wherein:

a thickness of the positive electrode current collector is smaller than a thickness of the negative electrode current collector, the lithium ion secondary battery has a weight power density of 1700 W/kg or more, one end portion of the positive electrode current collector is an exposed portion of the positive electrode current collector, and the positive electrode mixture layer is not provided at both surfaces of the exposed portion of the positive electrode current collector, one end portion of the negative electrode current collector is an exposed portion of the negative electrode current collector, and the negative electrode mixture layer is not provided at both surfaces of the exposed portion of the negative electrode current collector, the exposed portion of the positive electrode current collector is located at one end of an electrode plate group for the lithium ion secondary battery, the exposed portion of the negative electrode current collector is located at the other end of the electrode plate group for the lithium ion secondary battery, thickness Da of the positive electrode current collector and thickness Dc of the negative electrode current collector satisfy a relationship of $1.2 \leqq Dc/Da \leqq 2$, and the thickness of the positive electrode current collector is 8 μm or more and 25 μm or less.

2. The lithium ion secondary battery of claim 1, further comprising at least a single porous heat-resistant layer between the positive electrode plate and the negative electrode plate.

3. The lithium ion secondary battery of claim 2, wherein the porous heat-resistant layer includes an inorganic oxide filler.

* * * * *